United States Patent
Trachte

(10) Patent No.: US 7,352,365 B2
(45) Date of Patent: Apr. 1, 2008

(54) FLEXIBLE COMPUTER INPUT

(76) Inventor: Ralf Trachte, Adelbaendli 10, CH - 5000 Aarau (CH)

( * ) Notice: Subject to any disclaimer, the term of this patent is extended or adjusted under 35 U.S.C. 154(b) by 316 days.

(21) Appl. No.: 10/872,148

(22) Filed: Jun. 18, 2004

(65) Prior Publication Data

US 2005/0024344 A1 Feb. 3, 2005

Related U.S. Application Data

(63) Continuation of application No. PCT/EP02/14697, filed on Dec. 21, 2002.

(30) Foreign Application Priority Data

Dec. 21, 2001 (DE) ............... 101 63 664
Nov. 3, 2002 (DE) ............... 102 51 296

(51) Int. Cl.
*G09G 5/00* (2006.01)
(52) U.S. Cl. ............... 345/173; 345/156; 345/174; 345/175; 345/179
(58) Field of Classification Search ............... 345/173, 345/174–179, 156
See application file for complete search history.

(56) References Cited

U.S. PATENT DOCUMENTS 5,790,104 A * 8/1998 Shieh ............... 345/173
5,963,671 A * 10/1999 Comerford et al. ......... 382/230

FOREIGN PATENT DOCUMENTS

EP 0 670 554 9/1995

OTHER PUBLICATIONS

IBM Technical Disclosure Bulletin, vol. 36, No. 11, Nov. 1993, pp. 5-7.

* cited by examiner

*Primary Examiner*—Richard Hjerpe
*Assistant Examiner*—Leonid Shapiro
(74) *Attorney, Agent, or Firm*—Harness, Dickey & Pierce, P.L.C.

(57) ABSTRACT

The invention relates to a "Flexible Computer Input", determined from the data from a touch-sensitive input surface for fingertip positions and pressure trigger regions in comparison with a stored topography for the input signal of a computer. The base topography (base positions of the fingertips) and the layout topography (arrangement of the target pressure points) determined therefrom, can be changed and can thus be adjusted to ergonomically match individual hands and working practices. Said topography may be dynamically altered: progressive changes may be made (for example displacements of the hands, reductions in the average separations) and allowed for, such that a matching of the inputs to individual practices occurs. (See FIG. 1) An input surface which is as transparent as possible displays layouts or objects and works like a touchscreen or visualized touch area. An optional fine-motor feedback can be achieved by means of a surface of elastic construction with a determined geometry. The input is suitable for simplifying various tasks by the simultaneous recognition of two (or more) fingers.

13 Claims, 4 Drawing Sheets

FLEXIBLE COMPUTER INPUT

CROSS-REFERENCE TO RELATED APPLICATIONS

The present application is a continuation of pending International PCT Application No. PCT/EP02/14697 filed Dec. 21, 2002 and published in German, claiming priority of German Application No. 101 63 664.4, filed Dec. 21, 2001 and German Application No. 102 51 296.5, filed Nov. 3, 2002. The disclosures of the above applications are incorporated herein by reference.

FIELD OF THE INVENTION

The flexible computer input system described here is characterized in that, from information relating to a basic position of the fingertips and from measurement data of a sensitive input surface on which the acting fingertips are located, it determines the final signals and characters for a computer, and in doing so adapts itself individually and dynamically to hands and working habits.

BACKGROUND OF THE INVENTION

The customary computer input system keyboards require discipline to hit the keys in specific rows, and thus maintain specific distances. However, in fact the inputting of data can be adapted to individual hands and working habits because the important factor is just the basic existence of distances which can easily be changed and adapted individually and dynamically (or gradually) while working. As a result, ergonomic advantages are obtained. In particular for different shapes of hand and typing habits, a touch-sensitive surface which is extended in an as-it-were continuous fashion is easy and intuitive to handle. For example relatively small and fast typing movements are possible with individual assignment topography which is adapted dynamically.

SUMMARY OF THE INVENTION

The flexible computer input system described here is composed (not of conventional keys but rather) of a sensitive surface (i.e. an input surface composed of a plurality of input surface regions) and a software approach (i.e. a method). The arrangement determines the characters (for example letter signals or control signals) in particular in the typing mode from the basic positions of the ten fingertips ("basic topography") and from the locations where pressure is exerted. That is to say that, owing to the hand positions and hand movements or exertions of pressure on a relatively smooth, sensitive input surface, the associated characters are produced by comparison with a temporarily applicable "assignment topography". In the dynamic typing mode, the handling (with respect to the basic topography) can be adapted, in particular as-it-were automatically to the individual dimensions of a hand and typing habits, in so far as this is ergonomically appropriate. (The sensitive surface can optionally also be used as a (large) track pad, that is to say replace a mouse).

Three Product Versions are thus possible, for example:

(I). Firstly, a currently customary touch screen (for example that of a "Tablet PC") which can basically distinguish only one pressure point at a time can be upgraded with this flexible input system by means of appropriate software (cf. also conclusion of the description below). It requires the user to have a certain degree of discipline in applying his fingers in succession. ("simple touch-screen vision")

(II) Secondly, a touch screen (for example that of a "Tablet PC") in the lower region can be suplemented by a planar sensor system which can process a plurality of finger positions simultaneously. Although the visual quality is somewhat degraded in this case as a result of the addition of, for example, a fine sensor matrix, it is sufficient for representing the assignment topography. (Because these small, lightweight types of PC usually do not have a conventional keyboard in any case, they can then also use this flexible input which can be adapted ergonomically and individually). ("touch-screen-like vision")

(III) Thirdly, a relatively smooth sensitive input surface can be used as a separate keyboard or input unit for the computer. A certain degree of translucency of the surface is sufficient for representing the assignment topography (or the objects). Optionally, feedback in the form of precision motive forces, for example as a result of the elasticity of the operator control surface with specific cross-sectional profile (use of toggle effects) can be brought about here. ("visualizing-touch-surface vision")

DETAILED DESCRIPTION OF THE PREFERRED EMBODIMENTS

Figure 1:
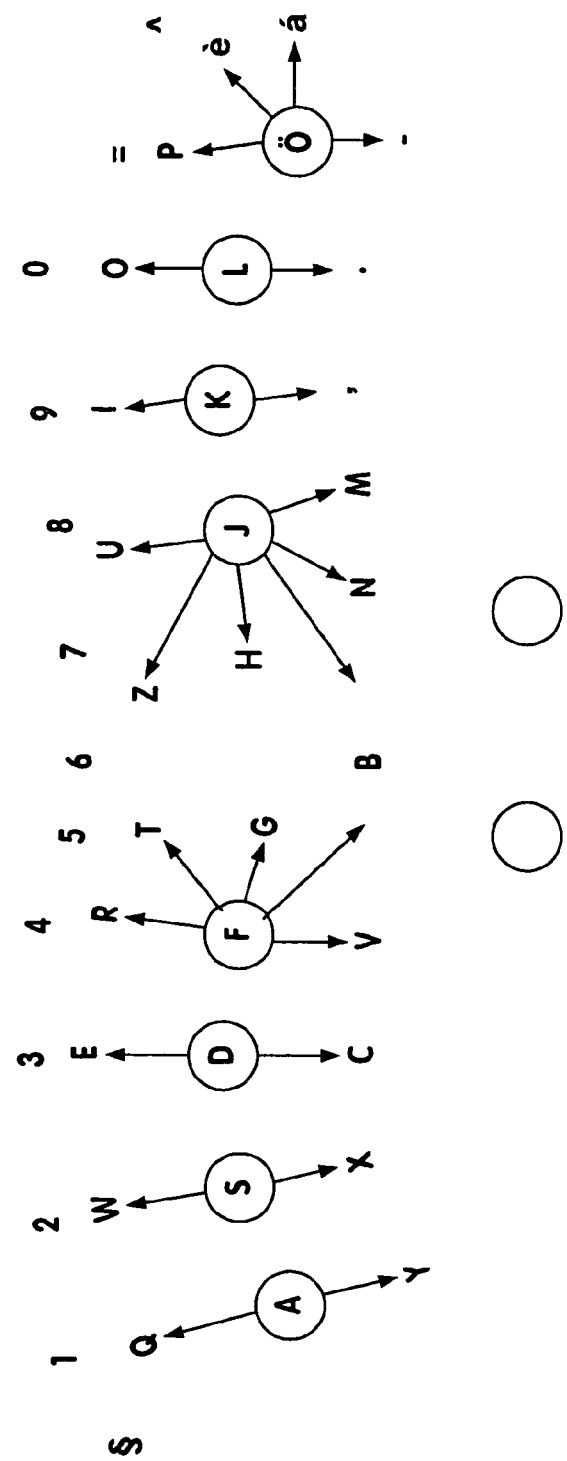
FIG. 1 is an illustration of an example of an input surface with basic topography (circles) and assignment topography (alphanumeric characters in specific input surface regions) and exemplary distances (arrows) from the closest characters or input surface regions, starting from the basic position.

This flexible computer input system is characterized inter alia by the fact that the processor is provided with a "basic topography" of the fingertips from which an "assignment topography" is also obtained, firstly by means of projection on a similar scale, and in that each measured point where pressure triggering takes place (or actuated input surface region) is compared with the temporarily applicable "assignment topography". The intended character is either obtained in a directly uniquely defined way from this relation. Or it is necessary (per processor), under certain circumstances (for example when there is only a coarsely meshed grid of the sensitive input surface), to identify the respectively active finger and as a result it is then possible to determine the associated character (or the associated instruction). This relation or identification which is to be interrogated is primarily related to the topography of a hand (or fingertip topography, represented in FIG. 1 as 10 circles).

In order to trigger the signal for a specific character (for example alphanumerical control character) certain inputs are used which are processed by a microprocessor or a corresponding electronic data processing unit. In particular the information (a) for pressure triggering or activation of the input surface regions, (b) the information for identifying the locations of the fingertips and (c) the information for the basic topography and assignment topography is used by the processor for ultimately triggering the character signal or control signal.

(a) The activation or pressure triggering with specific force and speed features can be measured on an as-it-were continuous (for example mechanically, electromechanically, electrostatically, electronically or magnetically) sensitive surface. (That is to say in particular the fact that the chronological gradients of the signals which are analogous to the force and of the signals which are analogous to the speed should reach values which can be set. As a result, for example it is possible to filter out unintended support with a finger other than the one which is active at a particular time, because that would result in a value which is too static in relative terms).

(b) The identification of the location of the pressure triggering on the sensitive surface leads, for example, to the description of the location by a grid of coordinates. Such coordinates can also be determined simultaneously for a plurality of fingers, for example on the basis of a technically modified, sensitive surface (possibly use two different sensitive methods, for example also a video image of the contours). The instantaneous positions of further fingers can therefore be determined.

(There are technical possibilities, for example by means of touch screen, touchpad, film surfaces, other mechanically, electrically, electrostatically or magnetically sensitive surfaces. An existing "5-wire resistance technology" could be improved, for example, by means of a "6-wire resistance technology" and supply additional information by means of pressure points and finger positions. Here, there will possibly have to be investment in development work, cf. also below with respect to technical feasibility. While the pressure triggering has to be localized in each case only for one finger, the positions of the other fingers should be determined as-it-were simultaneously or be determined in a triggered interrogation method (for example 5 times per second for the surface)).

The processor is always provided with a basic topography (or "template") of the 10 fingertips which represents a basic position of the hand. This topography is available in particular in the form of the coordinates of the 10 fingertips. (There are a plurality of ways of predefining this topography, see below.) The topography can be determined individually for each user and on top of that can be adapted dynamically. A (secondary) assignment topography which assigns specific characters to the input surface regions arises from the (primary) basic topography.

(c) The pressure triggering location (or the actuated input surface region) is to be compared with the current, temporarily stored assignment topography. The intended character is either obtained in a directly uniquely defined way from this relation. Or it is necessary (per processor) possibly (for example when there is unclear working or when there is only a coarsely meshed grid of the input surface) to optimize the decision (cf. below), or also to identify the respective active finger (that is to say for example left hand, middle finger), and as a result the associated character (or the associated instruction) can then be determined.

This relation or identification which is to be interrogated therefore relates to the assignment topography. The basic topography (or fingertip topography, represented in FIG. 1 as 10 circles) firstly provides the basis for also acquiring, starting from it (in a secondary fashion), a comprehensive assignment topography by projection of a similar scale. This assignment topography can be described as sectors or input surface regions which are specified by means of coordinates and which are attributed to a respective character or instruction assignment location. The basic topography covers or determines precisely the characters of the customary basic position (for the 8 fingers excluding the thumbs these are classically "A, S, D, F, J, K, L, Ö"). The next, adjoining pressure point positions require a specific small displacement (represented as arrows in the drawing) in order to reach the corresponding characters. The direction of this displacement can be clearly separated for the middle finger and ring finger. For the index finger and small finger, the coordinates must be differentiated more finely because there are (in the sense of the customary system) a plurality of options (cf. drawing). A new role could be assigned to the thumb (for example important instruction functions) because in the sense of the customary system it is actually underexploited. The further assignments are to be assigned in the sense of the assignment topography (see points C. and D. below). An assignment topography therefore always also follows from the hand topography (with the limiting values which can be set).

This "flexible input" is optionally characterized in that the positions and finger triggering operations of a plurality of fingers are determined and evaluated simultaneously (cf. Claim 2) on a sensitive input surface. As a result, it is possible to take facilitating measures and make flexible adaptations for the individual user.—The "flexible input" which is specified here is therefore characterized in that it determines not only the position of a finger but also the positions of a plurality of fingers (simultaneously), and generates corresponding control signals and determines associated characters on the basis of the positions, movements and (more or less rapid) pressure triggering operations of one, two, three or up to ten fingers on a (relatively) smooth, sensitive surface. The manoeuvres can be adapted to specific tasks and can thus be simplified and made ergonomically appropriate and "intuitively suitable".

The displacement of an implemented pressure location (or of an activated input surface region) from the home position (corresponding to the initialized or instantaneously stored hand topography, cf. FIG. 1) can be interpreted in the following way, and ultimately lead to an optimized decision for a specific signal:

A.) The displacement is less than a (settable) limiting value (for example 7 mm). The location is interpreted as a starting point of the finger. It results in a specific character (for example for the left-hand middle finger "D").

B.) The displacement is greater than the limiting value. The direction of the displacement is to be interpreted on the basis of the current template (in the sense of the home position) as an activity which is associated with a specific finger. If the direction is displaced, for example, more than 7 mm upwards from the home position, the character "E" is produced by means of the middle finger of the left hand.

C.) If the displacement (for example in the upward direction) is still greater than a second (settable) limiting value (for example 22 mm), this is equivalent to jumping over a character row, and therefore leads to the numbers (for example "3") being accessed, or special commands (which are also located, for example, to the side of and below the basic position) being accessed. As a result of this mode it is sufficient to hit the sector approximately, and the displacement only has to differ sufficiently from the row before it.

D.) The (largely) uniformly unbroken input surface should as far as possible have a certain degree of transparency in order to represent approximately the current template of the local assignments (assignment topography) using projections or LED elements. As a result, it is possible for the user to coordinate the finger movements with the eye for more distant assignments or for assignments which are difficult to remember (for example for special characters or instructions).—The following decision in the processor corresponds to this: an activation which affects the external assignment locations of the current template (special characters, instructions and the like) is always interpreted as a hit for these particular characters.

E.) It is also possible to operate or type in the "single finger" or "two finger mode" with this input, i.e. the ten finger system is exited. This is perceptible if a (repeated) "wandering" of a finger into a "foreign" assignment region takes place, which region is therefore actually not assigned to this finger. Or this mode switches on when the current hand position is unclear to the processor. Simply the previously agreed or stored template for assigning the assignment character to an activation location, independently of the identity of the respectively active finger applies in this mode. (It is usually necessary to look).

F.) Locations which are possibly pressed simultaneously (with two or more fingers) can easily be decided in the processor according to predefined probabilities or priorities ("filter options").

G.) Locations or input surface regions which have possibly been hit in an ambiguous fashion (for example when a boundary line is hit) can nevertheless be converted with a high degree of probability into the intended signals or characters on the basis of the identity (which can usually still be determined) of the respectively active finger (for example a middle finger which is moved upwards by 10 mm and presses can also have meant only one specific character even when there is lateral uncertainty).

One essential quality of this flexible inputting is the capability of adaptation to individual and to dynamic writing habits (cf. in particular Claims 1, 3, 7, 9 and 12). The temporarily stored basic topography (as a primary reference), (or thus also the resulting temporarily stored assignment topography as secondary reference) can be determined in the following way:

The topography could also correspond to a simple linear grid in the sense of customary standard keyboards. It can be varied, for example, slightly in its longitudinal extent and transverse extent.

The topography could also be adapted ergonomically to an average hand shape by means of curved lines, i.e. the assignments are grouped around an average hand which is put down in a relaxed fashion. In particular, this corresponds to the different lengths and movement possibilities of the 10 fingers (cf. FIG. 1).

Individual adaptation: however, the topography can be determined and stored in particular in an individual fashion for each user as a result of the fingers being put down in a relaxed fashion, and as a result the topography can be called. For this purpose, all 10 fingers should simply be positioned comfortably on the surface without moving (for example two seconds simultaneously as an initiating character for the standardization. This applies to the technically more complex variant which can sense a plurality of pressure points simultaneously).—In the technically simple variant, which can basically sense only one pressure point location simultaneously (in the same way as temporary touch screens), all 10 fingers should type once in succession approximately in the basic position for the standardization process.—This "basic topography" also results in the "assignment topography" as a result of a projection which is similar in scale, for example as a result of the fact that the distances from the other lines of the "assignment topography" are also defined approximately in proportion to the distances between the fingertips of the "basic topography".

Dynamic adaptation: The topography (basic and assignment topography) and the working characteristic values and limiting values can be adapted gradually and dynamically in particular during the operation. i.e. in this mode, the location points or pressure points which are implemented by the fingers on average, that is to say the average basic positions of the 10 fingers or the assignment topography, are continuously registered. Possible gradual displacements and possible gradual changes of the line distances which are implemented on average are noted and if appropriate corrected as decisive. (For example it is possible to measure five times per second and to average over the last 20 seconds or over the last 20 completed character activations of a specific input surface region). As a result, the user can gradually change the way he positions his hand and his writing habits and typing habits. In this sense it is possible to gradually or dynamically change a plurality of working characteristic values and limiting values which are used by the processor (in particular those for differentiating the geometric displacements from the basic position or for example those for differentiating intentional pressure triggering from passing by too quickly or from resting too statically). In particular, the distances which are implemented on average are determined with respect to the other assignment lines and the character activation pulses (chronological gradient) which are implemented on average, and if appropriate corrected as decisive. The type of projection can thus also be changed from a basic topography to the assignment topography. That is to say it is optionally, for example ultimately, also possible to trigger the respective character with extremely small (or idiosyncratic) hand movements. The typing and the inputting of control data can thus be reduced to minimal control movements or pressure triggering operations which are dependent on the person. (With reduced limiting values, the size and planar extent of the assignment topography are also decreased.)

This input system is to this extent "capable of learning". This arrangement makes the 10-finger writing system more attractive by virtue of the fact that it adapts itself to natural hand shapes and individual movements.

With this combination of (relatively smooth) input surface and flexible assignment topography, comfortable and fast working is possible, which also forgives certain errors by virtue of filter functions. The adaptation to individual hand shapes and hand manipulation takes place as-it-were automatically. (By means of a slight upward bulge in the centre the surface could be made to comply with further ergonomic requirements of the hands). Given the current trend for lightweight interfaces which can be operated intuitively, this ergonomically compatible and flexible concept provides particular marketing opportunities.

The technical feasibility of determining position (PosB) or activation of the input surface region and determination of pressure triggering (DruB) of a plurality of fingers is provided, for example, by virtue of the following proposals:

A (more or less fine) grid—which is materially present in the input surface—of conductive material permits the finger positions to be determined by measuring resistance or capacitance.

Capacitance:

The input surface is divided up, in the sense of a grid, into materially manifest, as-it-were dot-shaped elements. It can make available, in the sense of a specific resolution of the (for example 70?150) dot-like elements, the measurement data—changed by finger contacts—of all these elements in a capacitive measurement to the processor in order, at best, to calculate the determination of position (PosB)—which differs from the pressure triggering—and in all cases to calculate the determination of pressure triggering (DruB) of a plurality of fingers.—For example conductor tracks which are applied by vapour deposition and insulation layers can form the feeder lines to the dot-like sensors.

Or the technical feasibility for the "touch-screen-like vision" can for example be manufactured by virtue of the fact that specific visual pixels in the sensitive zone are replaced by pressure sensors (acting analogously to the force), or have said sensors superimposed on them (for example every fifth pixel or, for example, a surface of 2×2 pixels would have to be replaced by a pressure sensor in every fifth row of pixels).

The input surface is divided up into materially manifest, strip-shaped conductor elements. It can provide the processor—in the sense of a specific resolution of the (for example 150) strip-shaped elements—with the measurement data—changed by finger contacts—of these elements in a capacitive measurement, in order, at best, to calculate the determination of position (PosB)—to be different from the pressure triggering—and in each case to calculate the determination of pressure triggering (DruB) of a plurality of fingers.

Materially manifest conductors (cf. also the existing 5-fibre technology or the proposed 6-fibre technology) which run in 5 or 6 directions provide the unambiguous positions or pressure triggering locations of the fingers by means of the combination of the incoming signals.

The existing methods (for example operating with resistors, capacitors, field effects) of the touch screens are expanded: from the edges, the surface is covered not only in the x or y direction but also, for example, on three different axes (that is to say from 6 different "viewing angles"). A way of obtaining clear differentiation for the evaluation could be obtained by corresponding frequencies which are modulated differently (depending on the direction).

Figure 6:
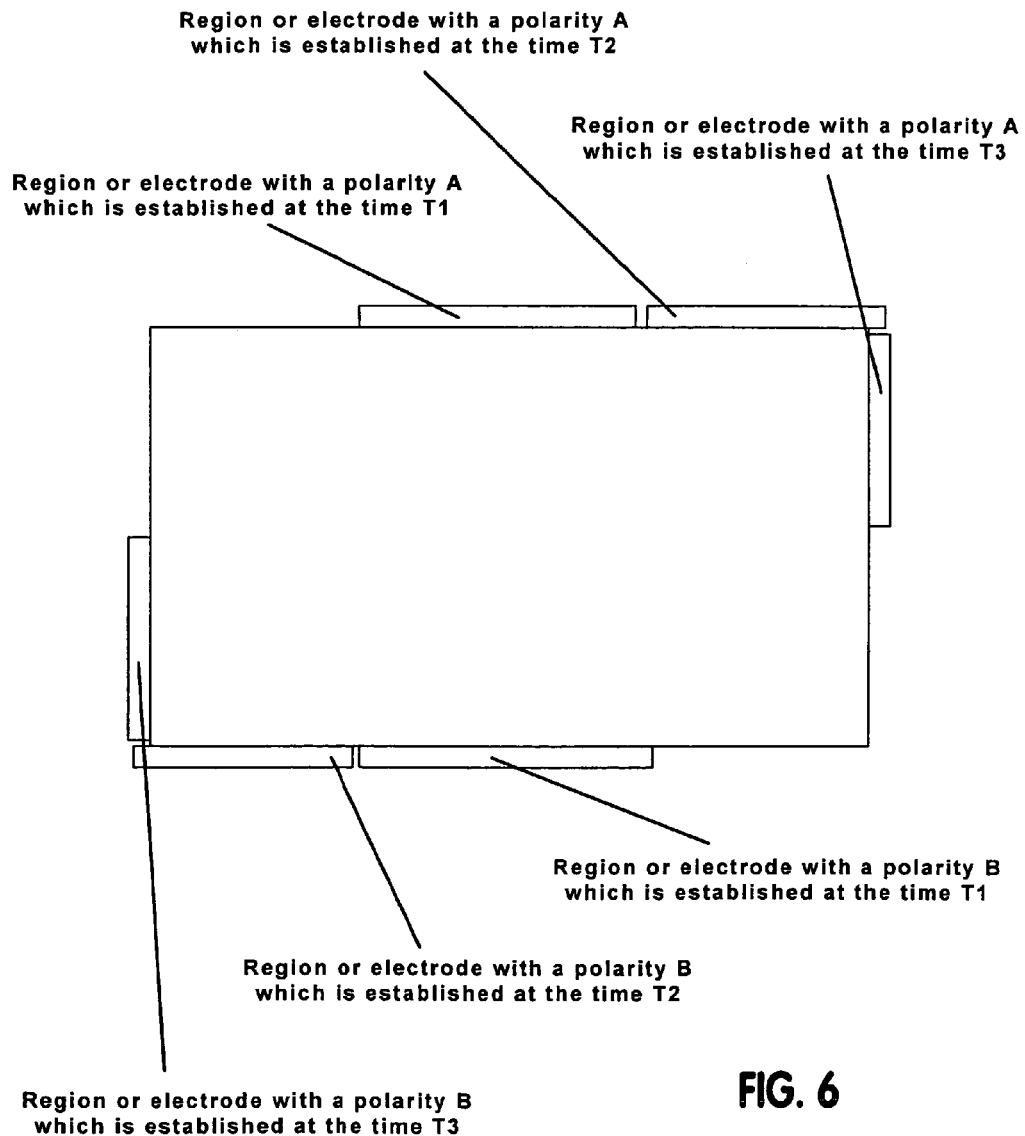
FIG. 6 is a plan view of an input surface with electrical fields which are established in a pluirality of directions in rapid succession (circulating through times T1, T2, T3, etc.).

The computer input system is optionally characterized in that the sensor system can be provided, for example, also by means of an electrical field which is established (repeatedly per second) in a plurality of directions, that is to say as-it-were established around the periphery (in particular for two fingers) for the simultaneous measuring of a plurality of finger positions. (cf. Claim 11 and FIG. 6)

The existing methods (operating for example with resistors, capacitors, field effects) of touch screens are expanded: from the edges, the surface is covered in terms of measuring equipment with the influence of the fingers not only in the x or y direction but also covered, for example, 10 times per second in, for example, six different axes, that is to say from 12 different "viewing angles" (comparable with the dial of a watch from which the internal region is viewed 12 times), in order to obtain data about finger positions. This comprises establishing a peripheral sensor field (as it were an inwardly directed "peripheral scanning operation" on the edge of the surface) (cf. FIG. 6). From this data it is possible to interpret the overlaps of the respectively found points as fingertips. (cf. also the evaluation methods of seismological investigations). This results in a specific direction, for example for two fingers positioned simultaneously, with a particularly pronounced bridging effect, that is to say the direction which both fingers form with one another. (The direction which is orthogonal to this exhibits a minimal bridging effect).

The input surface is optionally characterized (cf. Claim 5) in that it provides a feedback in the form of precision motive forces for the activation or pressure triggering, with a triggering force being perceptibly exceeded by virtue of the fact that it uses an elastic (as far as possible still translucent) surface with a certain geometric structure (the surface is supported by narrow struts which are placed transversely in an almost flat position) which is characterized in that it at the same time uses a toggle effect and bending effect and can be manufactured in particular by means of an extrusion method. A toggle effect and bending effect bring about, for the pressure activation, the rise in the resistance to a specific maximum value, and when this maximum value is exceeded the resistance collapses (because the narrow transverse struts bend) and allows the surface to be depressed by a specific distance (for example by 3 mm) in order to trigger the control signal.

The technical feasibility of the determination of position (PosB) and activation or determination of pressure triggering (DruB) of a plurality of fingers with feedback in the form of precision motive forces is therefore provided, for example, by means of the following proposal: the input surface (the "touch field") is structured as follows: the surface which is relatively smooth on the upper side is composed of an elastic and transparent (or translucent) material and has a specific geometry of the cross section so that it can be depressed by the finger with a specific force. This specific resistance force is to be configured by means of toggle effects with a specific geometry (in particular from respectively two-edged or only single-edged or only single-edged but two-element toggle elements, see FIGS. 2, 4 and 5) in such a way that when the surface is pressed it initially rises slightly, the maximum value is then reached, but the resistance force is then reduced again so that the triggering element also reliably and perceptively touches the surface below it (in particular a printed circuit board). This results in a desirable feedback in the form of precision motive forces for the finger movements.

Figure 2:
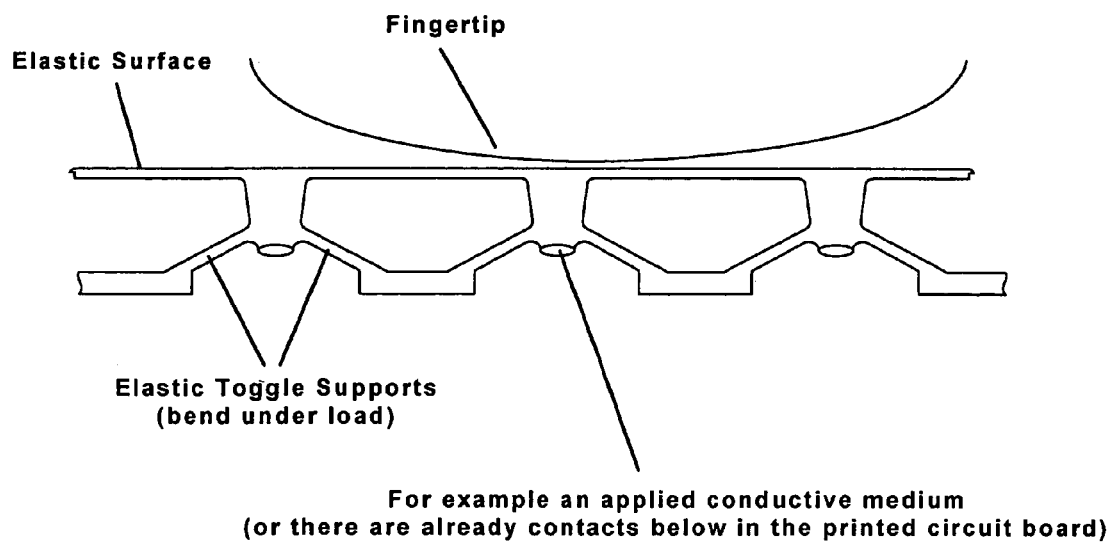
FIG. 2 is a cross-sectional view of an exemplary elastic input surface with sensomotive feedback.
Figure 3:
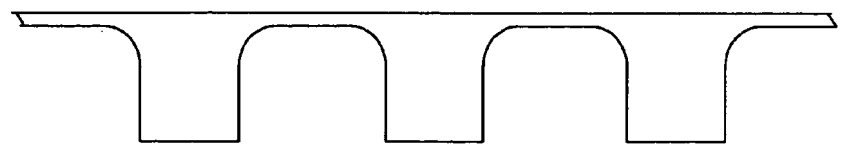
FIG. 3 is a cross-sectional view of an alternative exemplary elastic input surface with sensomotive feedback.
Figure 4:
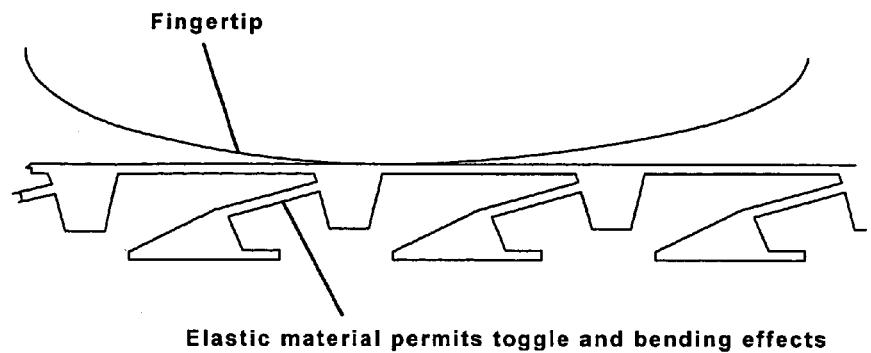
FIG. 4 is a cross-sectional view of a second alternative exemplary elastic input surface with sensomotive feedback.
Figure 5:
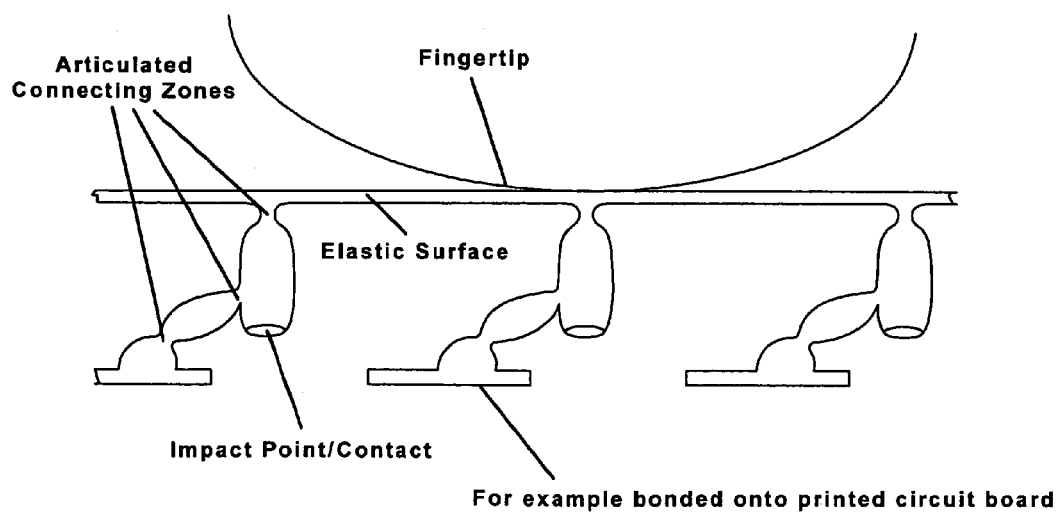
FIG. 5 is a cross-sectional view of a third alternative exemplary elastic input surface with sensomotive feedback.

This aforesaid input surface which operates with toggle and bending effects is characterized in particular by the fact that it can be manufactured by means of extrusion methods (see FIGS. 2, 4 and 5). Afterwards, (a) the constructed surface, which is complex per se, is left as it is, (b) this product is cut open from the underside to such an extent that the surface which runs through the top is retained or (c) a specific profile is cut out from this product (for example by means of hot profile cutting or laser cutting) from the underside (the surface running through the top is retained), to the extent that the toggle supports are separated from one another in the transverse direction, that is to say hardly influence one another anymore in the depression behaviour (see FIG. 3). In the case of (c), additional volume, in which for example LEDs can be accommodated, occurs under the surface. In a further step, specific contact zones may be manufactured on the underside by pressing on conductive (and at the same time elastic) material. In the last step, this product can be bonded onto a printed circuit board. This printed circuit board may be fitted, in particular, with conductor tracks transversely to the longitudinal pieces of the toggle supports (in order to determine the points of the pressure triggering by measuring resistance or capacitance, and passing said points on as a signal). And the printed circuit board can be fitted in particular with LED (or LCD) elements which can be seen through the transparent or translucent surface.—For example ribbing of the elastic input surface reduces the horizontal stresses. For example partially slitting open or cutting out this surface structure from below, in parallel with the extrusion profile (that is to say transversely with respect to the extrusion direction), improves the spring compression processes—dependent on one another—of the various sections and provides space, for example, for LEDs. The single-edged and two-element version of a toggle support system (FIG. 5) is still somewhat easier to press in and provides more volume for LED elements, for example.

This computer input system is also characterized in that it can perform further functions which provide facilitating measures and intuitive operation, in particular by means of the possibility of differentiating two (or more) simultaneously positioned fingers (apart from operation in the sense of a QWERT keyboard).

For example, there are resulting possibilities for automatic device controllers or games controllers by virtue of the fact that the input surface can be used as an analogue control (for example two index fingers and two thumbs) for simultaneous control signals (for example then 4?2 that is to say 8, on the basis of the x and y direction).

For example, the following facilitating measures and applications are also possible with this repertoire:
a) two fingers which are positioned and displaced simultaneously (for example for longer than 0.6 seconds) control the scrolling function of the screen display. By means of this stroking movement, the representation is displaced, as-it-were, through the direct grip of the two fingers.
b) pressing two fingers simultaneously (for example for longer than 0.3 seconds and with a minimum spacing of 6 mm) and moving them towards one another controls a zoom function/changing of scale of the display.
c) pressing three fingers simultaneously (for example for longer than 0.3 seconds up to 0.6 seconds) switches the next menu level on, for example.

Further applications of this computer input are possible:
keyboards for mobile phones, handheld computers or other devices with only relatively small displays or input fields (to be adapted, set and modified by the user himself).
(Instead of a display and a keypad, mobile phones can then simply have a flexible screen which permits different functions, in particular the rapid access, similar to clicking a mouse, to the objects displayed. A small screen can also enable certain quantities of data to be accessed quickly by means of the scroll and zoom functions.)
input devices for automatic devices and customer information and prompting systems
screens in vehicles (for example with map displays) where the screen surface can be used simultaneously as an (associative, graphically unambiguous) input surface.
CAD workstations
keyboards for synthesizers.

This system facilitates single-hand operator control operations.

The aforesaid computer input system can also be installed on an input surface or piece of hardware (in particular in its property of the ergonomic and dynamic adaptation to individual hand shapes and typing habits) which can operate only one activated point (or input surface region) at the same time (for example for conventional touch screens, cf. the abovementioned product version (I)). For this purpose, the initial standardization must be carried out to the individual hand topography or basic topography (initialization) by successive typing using 10 fingers. And then typing must be carried out as far as possible in succession without the plurality of fingers touching one another at the same time. Simultaneous occurrences of contact which may occur are to be uncovered, and eliminated, by means of filter functions (for example excessively slow change=change which is supported only statically or is too fast=touched only fleetingly).

For example, the application of the computer input system described here on customary touch screens can also be facilitated by the fact that a network-like web (or a layer which is smooth on the upper side but finely napped on the underside) is applied (for example in the lower region of the screen). The web (or the layer) rests on the screen only at specific points (for example every 2 millimeters in the x and y direction). As a result, the fingers (given corresponding standardization of the screen) can be positioned in a basically looser fashion without the touch screen evaluating this as a pressure triggering operation (activation), and only if a specific pressure force is exceeded, in fact as far as possible only with in each case one finger at the same time, does the punctual force (or the pressure) become magnified into the triggering signal as a result of the small supporting points.

This idea can basically be combined with the idea of feedback in the form of precision motive forces by virtue of a specific structure of the supported surface.

The invention claimed is:

1. Computer input system device with a touch-sensitive input surface having a plurality of input surface regions, and a control unit which is coupled to the input surface, in each case a character comprising a letter, a number or some other control symbol, being assigned to a specific one of said plurality of input surface regions, characterized in that the touch-sensitive input surface is configured in the topography of a computer keyboard defined by two substantially continuously updated topographies consisting of a basic topography corresponding to the respective positions of the fingertips of the hands in a basic keyboard position and an assignment topography defining the arrangement of target pressure points comprising said plurality of input surface regions arranged in positions determined relative to the positions of said basic topography, wherein the control unit dynamically adapts the positions of said plurality of input surface regions assigned to the various characters during operation of the device in response to actual finger keystroke contacts with the input surface, and further wherein the control unit substantially continuously monitors the position of the user's hands relative to the basic topography such that any change in the basic topography by the control unit causes a corresponding change in the assignment topography of the computer keyboard.

2. Computer input system device according to claim 1, characterized in that the control unit is configured to sense a plurality of contacts of the input surface simultaneously.

3. Computer input system device according to claim 1, characterized in that, in an initialization phase, the control unit assigns an input surface region to each character, this assignment taking place as a function of the topography of a hand of the user.

4. Computer input system device according to claim 1, characterized in that, in an initialization phase, the control unit assigns an input surface region to each character in accordance with a customary assignment of keys of a computer keyboard.

5. Computer input system device with a touch-sensitive input surface having a plurality of input surface regions, and a control unit which is coupled to the input surface, in each case a character comprising a letter, a number or some other control symbol, being assigned to a specific one of said plurality of input surface regions, characterized in that the touch-sensitive input surface is configured in the topography of a computer keyboard defined by two substantially continuously updated topographies consisting of a basic topography corresponding to the respective positions of the fingertips of the hands in a basic keyboard position and an assignment topography defining the arrangement of target pressure points comprising said plurality of input surface regions arranged in positions determined relative to the positions of said basic topography, wherein the control unit dynamically adapts the positions of said plurality of input surface regions assigned to the various characters during operation of the device in response to actual finger keystroke contacts with the input surface, and further wherein the control unit substantially continuously monitors the position of the user's hands relative to the basic topography such that any change in the basic topography by the control unit causes a corresponding change in the assignment topography of the computer keyboard, characterized further in that the input surface regions are coupled to mechanically operating switches comprising a plurality of toggle elements which extend laterally with respect to the surface, in order to enable an activation of the input surface region to be felt.

6. Computer input system device according to claim 1, characterized in that sensors for sensing an activation, which operate electromechanically, electrostatically, electronically and/or magnetically, are assigned to the input surface regions.

7. Method for operating a computer input system device according to claim 1, characterized in that
in a first phase (initialization phase), an input surface region of a touch-sensitive input surface is assigned to a character which is to be input, and
in a second phase (operating phase), the assignment of characters to an input surface region is dynamically adapted.

8. Method according to claim 7, characterized in that the assignment in the first phase is performed according to a predefined scheme in accordance with a customary assignment of keys of a computer keyboard.

9. Method according to claim 7, characterized in that the assignment in the first phase is performed as a function of the topography of a hand of the user when the user positions his fingers in a predetermined position on the input surface, so that the finger positions are then sensed and certain characters of the keyboard are assigned to the corresponding contacted input surface regions, and the other characters of the keyboard are assigned to the other input surface regions relative to the sensed finger positions.

10. Method according to claim 7, characterized in that the character which is assigned to an input surface region is visually displayed to the user so that the user can recognize the assignment of all the characters.

11. Computer input system device with a touch-sensitive input surface having a plurality of input surface regions, and a control unit which is coupled to the input surface, in each case a character comprising a letter, a number or some other control symbol, being assigned to a specific one of said plurality of input surface regions, characterized in that the touch-sensitive input surface is configured in the topography of a computer keyboard defined by two substantially continuously updated topographies consisting of a basic topography corresponding to the respective positions of the fingertips of the hands in a basic keyboard position and an assignment topography defining the arrangement of target pressure points comprising said plurality of input surface regions arranged in positions determined relative to the positions of said basic topography, wherein the control unit dynamically adapts the positions of said plurality of input surface regions assigned to the various characters during operation of the device in response to actual finger keystroke contacts with the input surface, and further wherein the control unit substantially continuously monitors the position of the user's hands relative to the basic topography such that any change in the basic topography by the control unit causes a corresponding change in the assignment topography of the computer keyboard, characterized further in that the activations of the input surface regions can be distinguished simultaneously for a plurality of fingers by means of an electrical field which is built up in rapid succession in various directions over the input surface.

12. The computer input system device of claim 1, wherein said basic topography includes the respective positions of all the fingertips of the hands including the positions of the two thumbs.

13. The computer input system of claim 11, wherein the electrical field is built up successively in a different direction multiple times per second.

* * * * *